United States Patent [19]

Yoshida

[11] Patent Number: 5,528,523

[45] Date of Patent: Jun. 18, 1996

[54] TRACK BALL MECHANISM

[75] Inventor: Keita Yoshida, Tokyo, Japan

[73] Assignee: Canon Kabushiki Kaisha, Tokyo, Japan

[21] Appl. No.: 553,745

[22] Filed: Oct. 23, 1995

Related U.S. Application Data

[63] Continuation of Ser. No. 145,608, Nov. 4, 1993, abandoned.

[30] Foreign Application Priority Data

Nov. 13, 1992 [JP] Japan .................................. 4-078268 U

[51] Int. Cl.$^6$ .............................. G06F 3/00; G09G 5/00; G09G 5/08
[52] U.S. Cl. ..................... 364/709.11; 345/156; 345/157; 345/167; 345/168; D14/114; D14/115
[58] Field of Search ........................... 364/708.1, 709.01, 364/709.11; 345/156, 157, 163–168; D14/106, 114, 115

[56] References Cited

U.S. PATENT DOCUMENTS

| | | | |
|---|---|---|---|
| 5,162,780 | 11/1992 | Solhjell | 345/163 |
| 5,268,675 | 12/1993 | Garthwaite et al. | 345/163 |
| 5,281,958 | 1/1994 | Ashmun et al. | 345/157 |
| 5,287,090 | 2/1994 | Grant | 345/163 |
| 5,287,246 | 2/1994 | Sen | 361/683 |
| 5,309,172 | 5/1994 | Fox | 345/159 |

*Primary Examiner*—Roy N. Envall, Jr.
*Assistant Examiner*—Emmanuel L. Moise
*Attorney, Agent, or Firm*—Fitzpatrick, Cella, Harper & Scinto

[57] ABSTRACT

A track ball mechanism for an information processing apparatus is assembled integrally with a palm rest member and is attached to an input device of the information processing apparatus.

2 Claims, 3 Drawing Sheets

TRACK BALL MECHANISM

This application is a continuation of application No. 08/145,608, filed Nov. 4, 1993, now abandoned.

BACKGROUND OF THE INVENTION

1. Field of the Invention

The invention relates to a mechanism of a track ball which is used in an information processing apparatus or the like.

2. Related Background Art

In an information processing apparatus such as a word processor, a personal computer, or the like, a track ball is a convenient input device because the ball can be operated by the thumb irrespective of right-handed or left-handed person when it is set on this side.

However, in most of the current word processors, personal computers, and the like of the lap top type, since a palm rest is provided in front of a keyboard, there is a problem that when a track ball is arranged on this side, the palm rest cannot be used (FIG. 1). In the case where the track ball is arranged on the side of an apparatus main body as shown in FIG. 2, there is an inconvenience that it is difficult for the left-handed person to use the track ball.

In the case of the type (FIG. 3) in which the track ball is built in the apparatus main body, there is a problem that the depth dimension of the information processing apparatus main body (word processor, personal computer, or the like) is large and a dead space occurs and, when the track ball is not used, it cannot be detached.

Further, there is also a problem that when the track ball is arranged in front of the apparatus main body by attaching to the conventional word processor, personal computer, or the like of the lap top type from the outside, the palm rest cannot be used and, on the other hand, in the case where the track ball is attached to the side surface of the main body, it is 10 difficult for either the right-handed person or the left-handed person to use the track ball.

Further, in case of the conventional type in which the track ball is built in the information processing apparatus main body, there is a problem that the depth dimension of the main body is large and a dead space occurs and, when the track ball is not used, it cannot be detached.

FIG. 1 shows an example of a type in which a track ball is built in the information processing apparatus main body. In this case, however, the track ball cannot be detached and a dead space occurs, and the costs of the main body increase by an amount of the built-in track ball.

In the case where the track ball is arranged on the front or side surface as shown in FIG. 2 or 3, it is also difficult to attach the track ball to the information processing apparatus main body, and further, there is no harmony in design.

When a style of the information processing apparatus main body (word processor, personal computer, or the like) changes, it is necessary to remake the track ball in accordance with the new style.

SUMMARY OF THE INVENTION

It is an object of the invention to provide a track ball mechanism in which even when an information processing apparatus main body (word processor, personal computer, or the like) has any style, by arranging a track ball on this side and by combining the track ball with a palm rest, a good operating efficiency is obtained without an operator getting tired and the track ball can be also easily attached to the main body.

Another object of the invention is to provide a track ball mechanism in which when a track ball is attached to an apparatus main body, there is a harmony between the main body and the track ball on design.

DETAILED DESCRIPTION OF THE PREFERRED EMBODIMENTS

Figure 1:
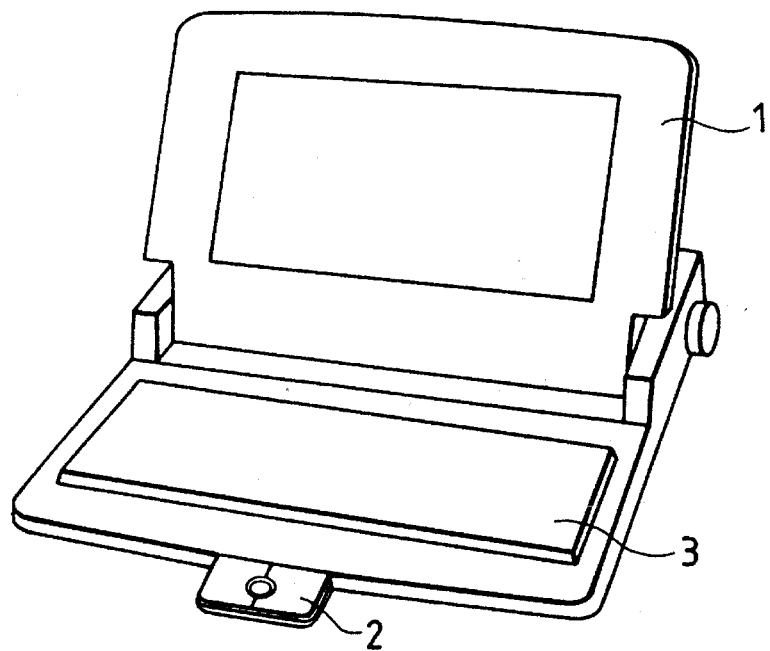
FIG. 1 is a diagram showing a conventional example.
Figure 2:
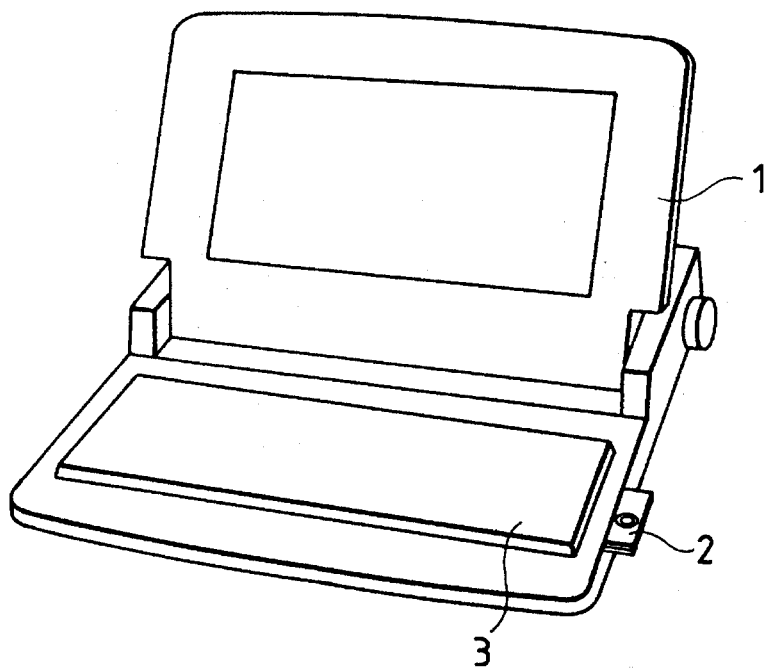
FIG. 2 is a diagram showing a conventional example.
Figure 3:
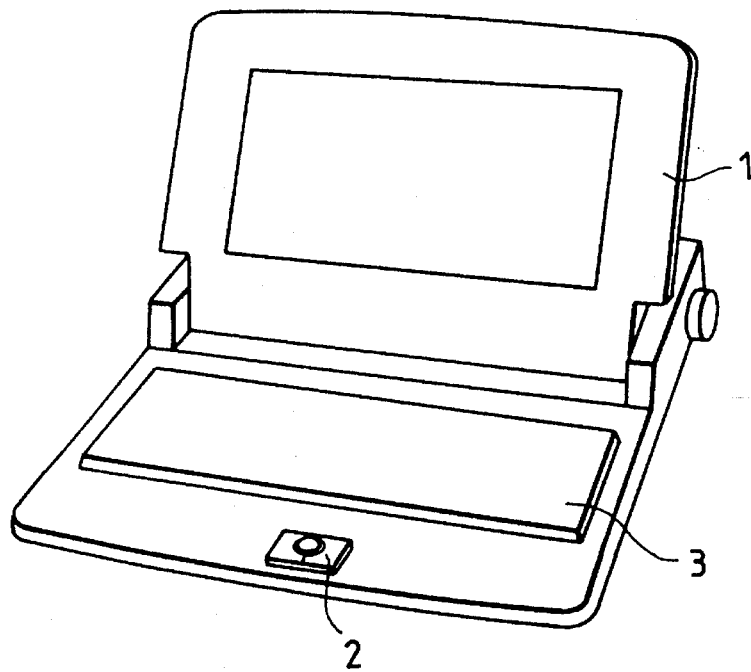
FIG. 3 is a diagram showing a conventional example.

FIGS. 1 to 3 show the conventional method. In case of the conventional system of FIG. 1, when the user uses the track ball for a long time, he will be tired. It is also troublesome to attach a track ball mechanism 2 to an information processing apparatus main body 1 (word processor, personal computer, or the like).

In case of arranging the track ball to the side surface of a keyboard 3 in FIG. 2, there is an inconvenience such that it is difficult for either the right-handed person or left-handed person to use the track ball. The user must remove the hand away from the keyboard 3 and the operating efficiency is also bad.

In the case of FIG. 3, the depth dimension of the main body 1 (word processor, personal computer, or the like) is large and, in case of a newly-shaped main body 1, the track ball 2 is wasted.

Figure 4:
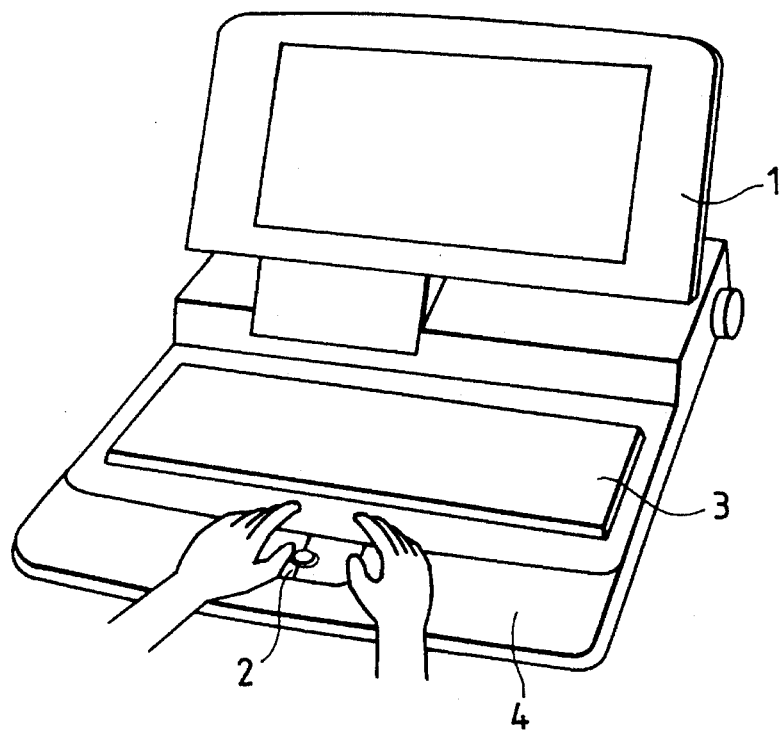
FIG. 4 is a diagram showing a structure of a track ball according to the invention.
Figure 5:
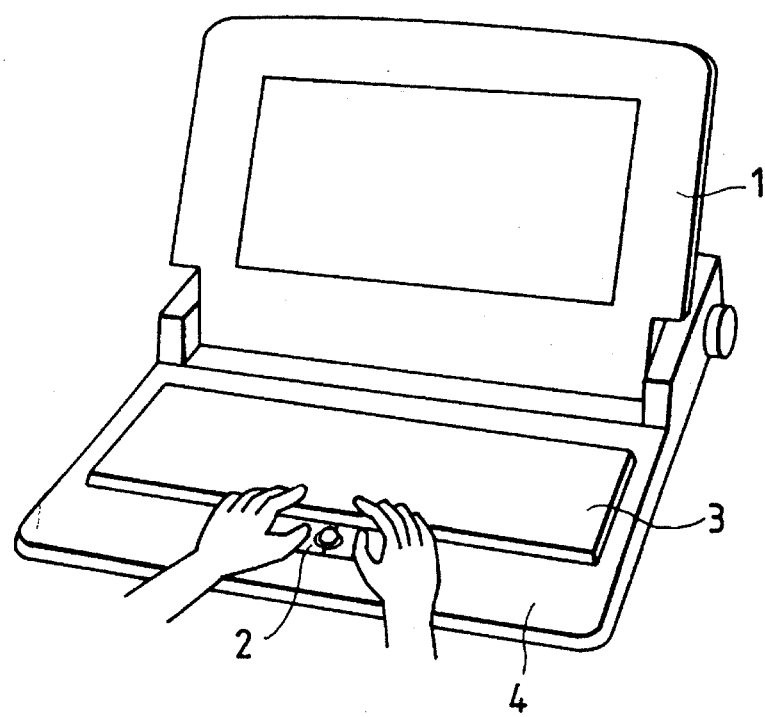
FIG. 5 is a diagram showing a structure of another track ball according to the invention.

Therefore, by constructing the system as shown in FIG. 4 or 5, it is possible to realize a system having both a space saving property in which a track ball can be detached as shown in FIG. 1, and good operability of the track ball as shown in FIG. 3. Also, the track ball can be easily attached to the main body 1 (word processor, personal computer, or the like) and achieve a design with good harmony.

In FIGS. 4 and 5, although a particular method of attaching a palm rest 4 and the track ball 2 to the main body 1 is not shown, they can be attached by an ordinary well-known attaching method.

Figure 6:
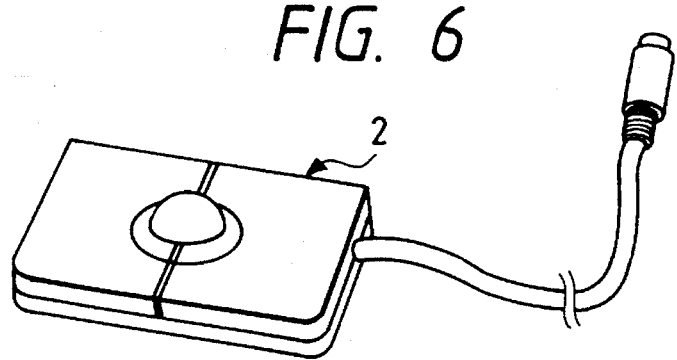
FIG. 6 is a diagram showing a detached track ball.
Figure 7:
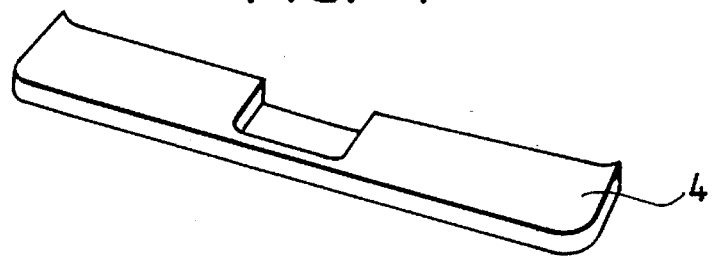
FIG. 7 is a diagram showing a palm rest to which a track ball is assembled.

As described above, by arranging the track ball 2 at a position on this side at which the track ball can be easily operated as shown in FIG. 6, and by assembling the track ball in combination with the palm rest 4 as shown in FIG. 7, there are effects such that the operability is good, there is hardly any fatigue, there is a good design having harmony with the main body 1 (word processor, personal computer, etc.), and the track ball can be easily attached.

What is claimed is:

1. A track ball mechanism for an information processing apparatus, comprising:

a palm rest member detachably attached directly to an input device of the information processing apparatus in front of the input device, said palm rest member having a groove portion and having a width matching the width of the information processing apparatus; and a track ball fitted into said groove portion of said palm rest member and integrally fixed to said palm rest member, said track ball being positioned in front of the input device when said palm rest member is attached to the information processing apparatus.

2. A mechanism according to claim 1, wherein said information processing apparatus is a word processor and the input device is a keyboard.

* * * * *

UNITED STATES PATENT AND TRADEMARK OFFICE
CERTIFICATE OF CORRECTION

PATENT NO. : 5,528,523
DATED : June 18, 1996
INVENTOR(S) : Yoshida

It is certified that error appears in the above-indentified patent and that said Letters Patent is hereby corrected as shown below:

COLUMN 1:

Line 37, "10" should be deleted.

COLUMN 4:

Line 3, "said" should read --the--.

Signed and Sealed this

Fifth Day of November, 1996

Attest:

BRUCE LEHMAN

Attesting Officer          Commissioner of Patents and Trademarks